United States Patent [19]

Sakakibara et al.

[11] 4,347,763
[45] Sep. 7, 1982

[54] ONE-WAY BRAKE

[75] Inventors: Shiro Sakakibara, Toyokawa; Kazumasa Tsukamoto, Toyota; Takahiro Sakai, Toyota; Yukio Terakura, Toyota, all of Japan

[73] Assignee: Aisin Warner K.K., Anjo, Japan

[21] Appl. No.: 155,614

[22] Filed: Jun. 2, 1980

[30] Foreign Application Priority Data

Sep. 13, 1979 [JP] Japan .............................. 54-127560[U]

[51] Int. Cl.³ ....................... F16H 57/10; F16D 59/00
[52] U.S. Cl. ........................................ 74/789; 74/688; 188/82.8
[58] Field of Search .............. 192/41 A, 45.1; 74/688, 74/789; 188/82.8

[56] References Cited

U.S. PATENT DOCUMENTS

| 3,620,100 | 11/1971 | Chana | 74/688 |
| 3,651,908 | 3/1972 | Oldfield | 192/41 A X |
| 3,741,037 | 6/1973 | Piret | 74/789 X |
| 4,011,776 | 3/1977 | Kodama et al. | 74/789 |

FOREIGN PATENT DOCUMENTS

| 648281 | 9/1962 | Canada | 192/45.1 |
| 914772 | 7/1946 | France | 192/41 A |

Primary Examiner—Allan D. Herrmann
Attorney, Agent, or Firm—Cooper, Dunham, Clark, Griffin & Moran

[57] ABSTRACT

A one-way brake having end bearings the support wall of each of which is protruded at the inner race side portion thereof in the outward direction with respect to a space between inner and outer races from that surface of the support wall which is contacted by a support means connected to the outer race, to thereby increase the area of that portion of the inner race which is in sliding contact with an inner rib of the support wall. Accordingly, the wear resistance and stiffness of the end bearings can be increased without increasing an attaching space.

5 Claims, 3 Drawing Figures

ONE-WAY BRAKE

BACKGROUND OF THE INVENTION

1. Field of the Invention

The present invention relates to a one-way brake applied mainly to a gear mechanism in an automatic transmission of vehicles and, more particularly, to an improvement in the wear resistance and stiffness of end bearings in a one-way brake.

2. Description of the Prior Art

A one-way brake is generally provided at each side thereof with an end bearing made of a bearing alloy containing copper or lead as a main component, so as to maintain the concentricity of the inner and outer races and guide retainers for sprags constituting the one-way brake. Each of these end bearings generally has a C-shaped cross section and is produced by sheet metal.

An end bearing, which is a kind of bearing for maintaining the concentricity of inner and outer races, requires a high wear resistance and a high concentricity-maintaining capability, i.e. stiffness with respect to external forces caused by the unbalance of the races.

In a case where an automatic transmission using conventional cross-sectionally C-shaped end bearings is mounted on a vehicle of an increased capacity, or in a case where such an automatic transmission is used at a high speed, the wear resistance and stiffness of the end bearings cannot be ensured. Namely, a one-way brake using such conventional end bearings has no sufficiently high endurance.

SUMMARY OF THE INVENTION

An object of the present invention is to improve the endurance of a one-way brake.

Another object of the present invention is to improve a cross section of end bearings in a one-way brake to increase the wear resistance and stiffness of the end bearings.

These objects can be achieved by increasing the area of that portion of an end bearing which is in sliding contact with an outer race or an inner race of a one-way brake, without increasing the mounting space.

The above and other objects as well as advantageous features of the invention will become clear from the following description of a preferred embodiment taken in conjunction with the accompanying drawings.

Before entering into a description of a preferred embodiment of the present invention, an automatic transmission to which a one-way clutch according to the present invention is attached will be described for the purpose of having the present invention understood clearly.

DETAILED DESCRIPTION OF THE PREFERRED EMBODIMENT

Figure 1:
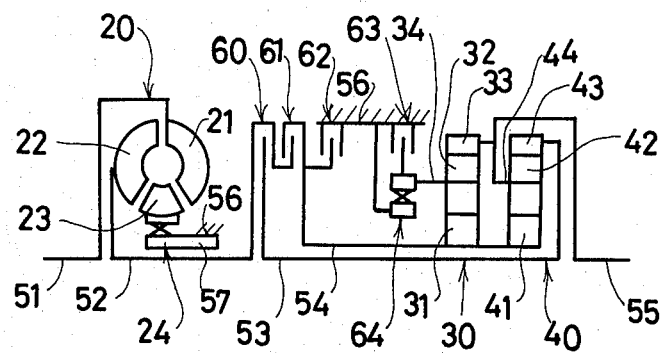
FIG. 1 is a schematic diagram of an automatic transmission to which one-way clutches are attached.

FIG. 1 is a schematic diagram of a power transmission mechanism in a three-speed automatic transmission for automobiles.

This power transmission mechanism is provided with a drive shaft 51 of an engine mounted on the vehicle, an input shaft 52, intermediate shafts 53, 54, and an output shaft 55 connected to a drive wheel of the vehicle.

The power transmission mechanism is further provided with a torque converter 20, hydraulic friction clutches 60, 61, hydraulic friction brakes 62, 63, one-way brakes 64, 24, and planetary gear mechanisms 30, 40.

The torque converter 20 is provided with a pump impeller 21 driven by the drive shaft 51, a turbine runner 22 connected to the input shaft 52, and a stator 23. The stator 23 is rotatably fixed via the one-way brakes 24 on a sleeve 57 secured to a transmission housing 56. The one-way brake 24 permits a forward rotation of the stator 23 and restricts a backward rotation thereof. The direction in which the stator 23 is forwardly rotated is the same as the direction in which the drive shaft 51 is rotated.

The first friction clutch 60 is disposed such as to thereby connect the input shaft 52 to the intermediate shaft 53. The second friction clutch 61 is disposed such as to thereby connect the input shaft 52 to the intermediate shaft 54 which is rotatably attached to the intermediate shaft 53. The first planetary gear mechanism 30 is provided with a sun gear 31 fixedly mounted on the intermediate shaft 54 the rotation of which can be stopped by the first friction brake 62, a planetary pinion 32 meshed with the sun gear 31, and a ring gear 33 meshed with the planetary pinion 32. The planetary pinion 32 is rotatably supported on a carrier 34 which is rotatably provided in a housing 56 via the one-way brake 64. The ring gear 33 is connected to the output shaft 55, and the carrier 34 can be stopped by the second friction brake 63. The one-way brake 64 permits a forward rotation of the carrier 34, and restricts a backward rotation thereof. The direction in which the carrier 34 is forwardly rotated is the same as the direction in which the drive shaft 51 is rotated.

The second planetary gear mechanism 40 is provided with a sun gear 41 fixedly mounted on the intermediate shaft 54, a planetary pinion 42 meshed with the sun gear 41, and a ring gear 43 meshed with the planetary pinion 42. The ring gear 43 is connected to the intermediate shaft 53, and the planetary pinion 42 is rotatably supported on a carrier 44 provided on the output shaft 55.

The friction clutches 60, 61, friction brakes 62, 63, and one-way brake 64 in a power transmission mechanism of the above-described construction are actuated or deactuated by a hydraulic control means (not shown) in accordance with Table 1 in each stage of speed change of the automatic transmission. Referring to Table 1, a letter o indicates "in operation", a blank "not in operation", a triangle "operable only when an engine brake is in operation", and a square "operable, i.e. lockable only when the engine is driven".

TABLE 1

| Stage of speed change | Friction clutches 60 | Friction clutches 61 | Friction brakes 62 | Friction brakes 63 | One-way brake 64 |
|---|---|---|---|---|---|
| First stage | O | | | Δ | □ |

TABLE 1-continued

| Stage of speed change | Friction clutches | | Friction brakes | | One-way brake |
|---|---|---|---|---|---|
| | 60 | 61 | 62 | 63 | 64 |
| Second stage | O | | O | | |
| Third stage | O | O | | | |
| Reverse | | | O | | O |

The construction of a one-way brake 64 according to the present invention will be described with reference to an embodiment thereof shown FIGS. 2 and 3.

Figure 2:
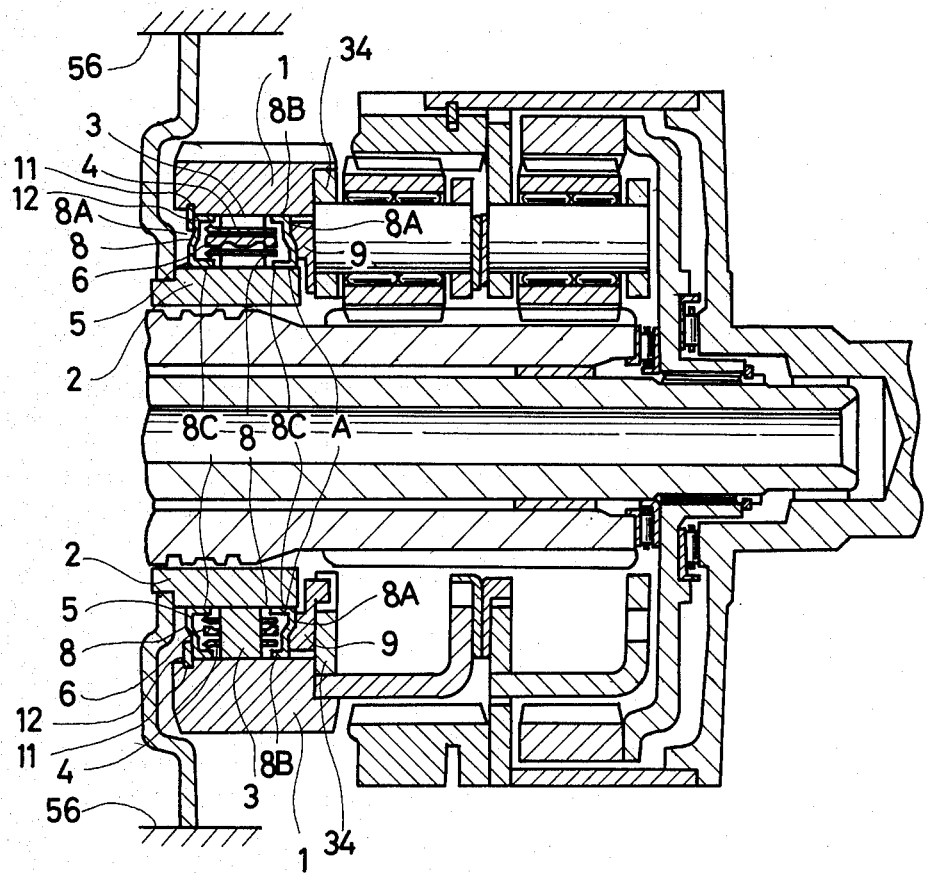
FIG. 2 is a sectional view of that portion of an automatic transmission to which a one-way brake according to the present invention is attached.
Figure 3:
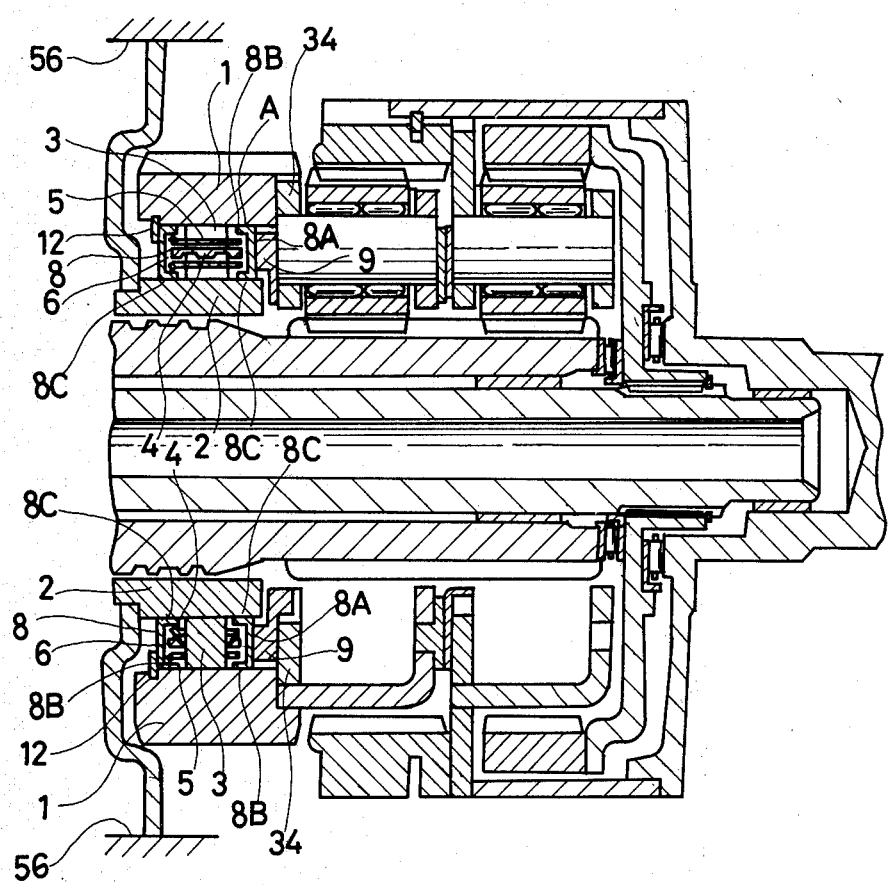
FIG. 3 is a sectional view of that portion of an automatic transmission to which a conventional one-way brake is attached.

Referring to FIGS. 2 and 3, reference numeral 1 denotes an outer race connected to a planetary gear P of an automatic transmission, and 2 an inner race fixed to a case C of the automatic transmission. A plurality of sprags 3, which are held in windows of annular, window-carrying cages 4, 5 and window-carrying isolation springs 6, are provided in an annular space A between outer and inner races 1, 2. Reference numeral 8 denotes end bearings each of which has on its annular support wall 8A an outer rib 8B which is in sliding contact with the inner surface of the outer race, as well as an inner rib 8C which is in sliding contact with the outer surface of the inner race and which is extended in the same direction as the outer rib 8B. The end bearings 8 are fitted in the space A in an opposed relationship such that both end portions of the space A are closed therewith. Each of the end bearings 8 in the embodiment of the present invention fitted in the space A is held at an outer race-side portion of the support wall 8A thereof between a spacer 9 which is inserted in contact with a planetary carrier 34 and which constitutes one of stopping means consisting of stopper plates fitted into a groove provided in the inner circumferential surface of the outer case for the end bearings, and a snap ring 12 which is fitted into a groove 11 provided in the inner circumferential surface of the outer race and which constitutes the other stopping means for the end bearings.

Since a conventional end bearing is formed such that it has a C-shaped cross section, it has a small surface at which it is slidingly moved on the inner race. Accordingly, a conventional end bearing is not sufficiently high in wear resistance and stiffness.

The support wall 8A of an end bearing 8 according to the present invention is protruded at the inner race side portion thereof cross-sectionally in the shape of a letter "C" in the outward direction with respect to the annular space A. The width of the inner rib 8C is greater than that of the outer rib 8B by an amount equal to the distance by which the support wall A protrudes. The end bearing side wall of the spacer 9 is spaced from the end bearing a distance equal to the distance which the support wall 8A protrudes.

Since the inner rib 8C of the end bearing 8, at which the end bearing 8 slides on the outer surface of the inner race 2, has a large width, the area of the slide surface of the end bearing 8 is increased. This allows a pressure applied to the surface of the end bearing to be reduced. As a result, the wear on the end bearing due to the sliding movements thereof can be minimized. Since the axial width of the end bearing 8 is increased by an amount by which the support wall 8A is protruded, the stiffness of the end bearing is also increased.

Since the wear resistance and stiffness of the end bearing 8 are improved as mentioned above, the concentricity of the inner and outer races can be ensured. This allows a one-way brake to be remarkably improved in endurance.

The support wall of the end bearing may be protruded in other cross-sectional shape than is stated in the above description of preferred embodiment.

The present invention is not, of course, limited to the above embodiment; it may be modified in various ways within the scope of the appended claims.

What is claimed is:

1. A one-way brake comprising a plurality of sprags held by annular cages and annular isolation springs and inserted in an annular space between outer and inner races; end bearings each of which consists of an annular and radially extended support wall, an axially extended outer rib contacting the inner circumferential surface of said outer race, and an inner rib axially extended in the same direction as said outer rib and contacting the outer circumferential surface of said inner race, and each of which is inserted in said annular space; and stopper means consisting of stopper plates connected to said outer race of snap ring fitted into groove provided in the inner circumferential surface of said outer race to thereby hold in said annular space the outer race side portion of the support wall of said end bearings, characterized in that each of said support walls is protruded at the inner race side portion thereof in the outward direction with respect to said annular space from that surface of said support wall which is contacted by said stopper means connected to said outer race, to thereby increase the area of that portion of said inner race which is in sliding contact with said inner rib.

2. A one-way brake according to claim 1, wherein the protrusion of the support wall of each of said end bearings is effected such that said support wall has a C-shaped cross section.

3. A one-way brake according to claim 1, wherein said one-way brake consists of a one-way brakes between a planetary carrier for a planetary gear mechanism and a transmission housing for automobiles.

4. A one-way brake according to claim 2, wherein said one-way brake consists of a one-way brake between a planetary carrier for a planetary gear mechanism and a transmission housing for automobiles.

5. A one-way brake according to claim 3, wherein one of stopping means for an end bearing constitutes an annular spacer which is inserted between an annular support wall of the end bearing and a planetary carrier in a planetary gear mechanism connected to the outer race, and the end bearing side wall of the spacer is spaced for the end bearing by a distance equal to that by which the support wall is protrudes.

* * * * *